(12) United States Patent
Sasaki

(10) Patent No.: US 8,107,140 B2
(45) Date of Patent: Jan. 31, 2012

(54) COLOR PROCESSING APPARATUS, COLOR PROCESSING METHOD, AND COMPUTER READABLE MEDIUM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 544 days.

(21) Appl. No.: 11/783,343

(22) Filed: Apr. 9, 2007

(65) Prior Publication Data

US 2008/0062482 A1 Mar. 13, 2008

(30) Foreign Application Priority Data

Sep. 11, 2006 (JP) .............................. P2006-245941

(51) Int. Cl.
*G03F 3/08* (2006.01)

(52) U.S. Cl. ....... 358/518; 358/1.9; 358/3.01; 358/3.23; 358/520; 358/521; 358/522; 358/523; 382/167

(58) Field of Classification Search .................. 358/1.9, 358/3.01, 3.23, 518–523; 382/167
See application file for complete search history.

(56) References Cited

U.S. PATENT DOCUMENTS

| | | | | | |
|---|---|---|---|---|---|
| 5,239,370 | A | * | 8/1993 | Yamaguchi | 358/518 |
| 5,615,312 | A | * | 3/1997 | Kohler | 358/1.9 |
| 5,809,164 | A | * | 9/1998 | Hultgren, III | 382/162 |
| 6,151,136 | A | * | 11/2000 | Takemoto | 358/1.9 |
| 6,181,445 | B1 | * | 1/2001 | Lin et al. | 358/520 |
| 6,198,843 | B1 | * | 3/2001 | Nakauchi et al. | 382/167 |
| 6,285,798 | B1 | * | 9/2001 | Lee | 382/260 |
| 6,373,595 | B1 | * | 4/2002 | Semba et al. | 358/1.9 |
| 6,480,202 | B1 | * | 11/2002 | Deguchi et al. | 345/600 |
| 6,724,507 | B1 | * | 4/2004 | Ikegami et al. | 358/518 |
| 6,731,823 | B1 | * | 5/2004 | Gallagher et al. | 382/266 |
| 6,961,037 | B2 | * | 11/2005 | Kuwata et al. | 345/88 |
| 6,995,865 | B1 | * | 2/2006 | Motomura | 358/1.9 |
| 7,023,580 | B2 | * | 4/2006 | Zhang et al. | 358/1.9 |
| 7,084,881 | B1 | * | 8/2006 | Chen et al. | 345/589 |
| 7,170,634 | B2 | * | 1/2007 | Kanai | 358/1.9 |
| 2005/0128497 | A1 | | 6/2005 | Hirashima et al. | 358/1.9 |
| 2006/0072173 | A1 | | 4/2006 | Okamoto et al. | |

FOREIGN PATENT DOCUMENTS

| | | |
|---|---|---|
| CN | 1627356 A | 6/2005 |
| JP | 08-223433 | 8/1996 |
| JP | 11-069184 | 3/1999 |
| JP | 2003-266797 | 9/2003 |
| JP | 2005-341260 | 12/2005 |
| JP | 2006-14284 | 1/2006 |
| JP | 2006-157757 | 6/2006 |
| JP | 2006-166032 | 6/2006 |

\* cited by examiner

*Primary Examiner* — King Poon
*Assistant Examiner* — Richard Zhu
(74) *Attorney, Agent, or Firm* — Morgan, Lewis & Bockius LLP

(57) ABSTRACT

A color processing apparatus includes a storage section, a normalizing section and a tone correction section. The storage section stores tone correction information used in tone correction for a color signal to be corrected. The normalizing section reads the tone correction information from the storage section and normalizes the read tone correction information in accordance with the color signal to be corrected to generate normalized tone correction information. The tone correction section converts the color signal to be corrected into a corrected color signal using the normalized tone correction information.

18 Claims, 12 Drawing Sheets

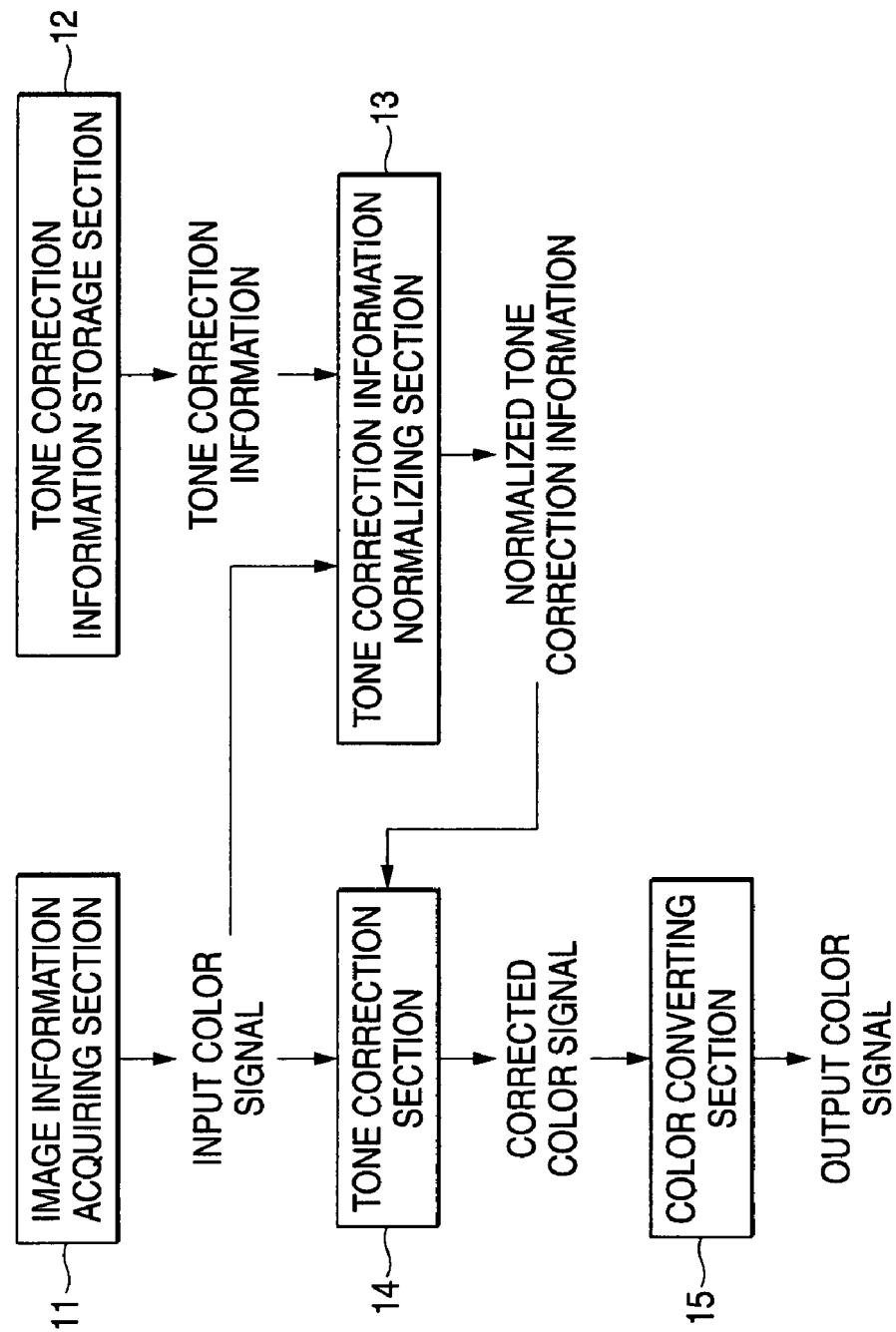

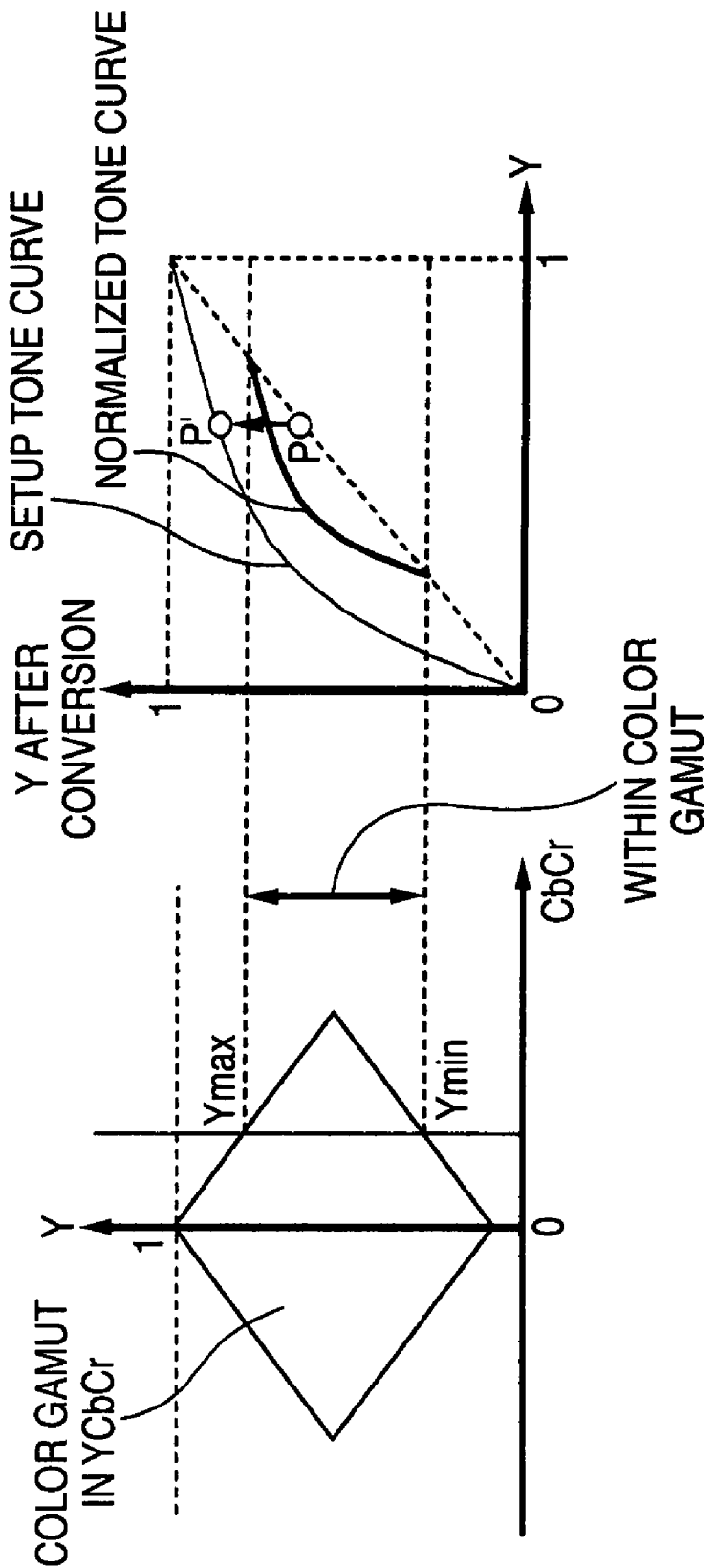

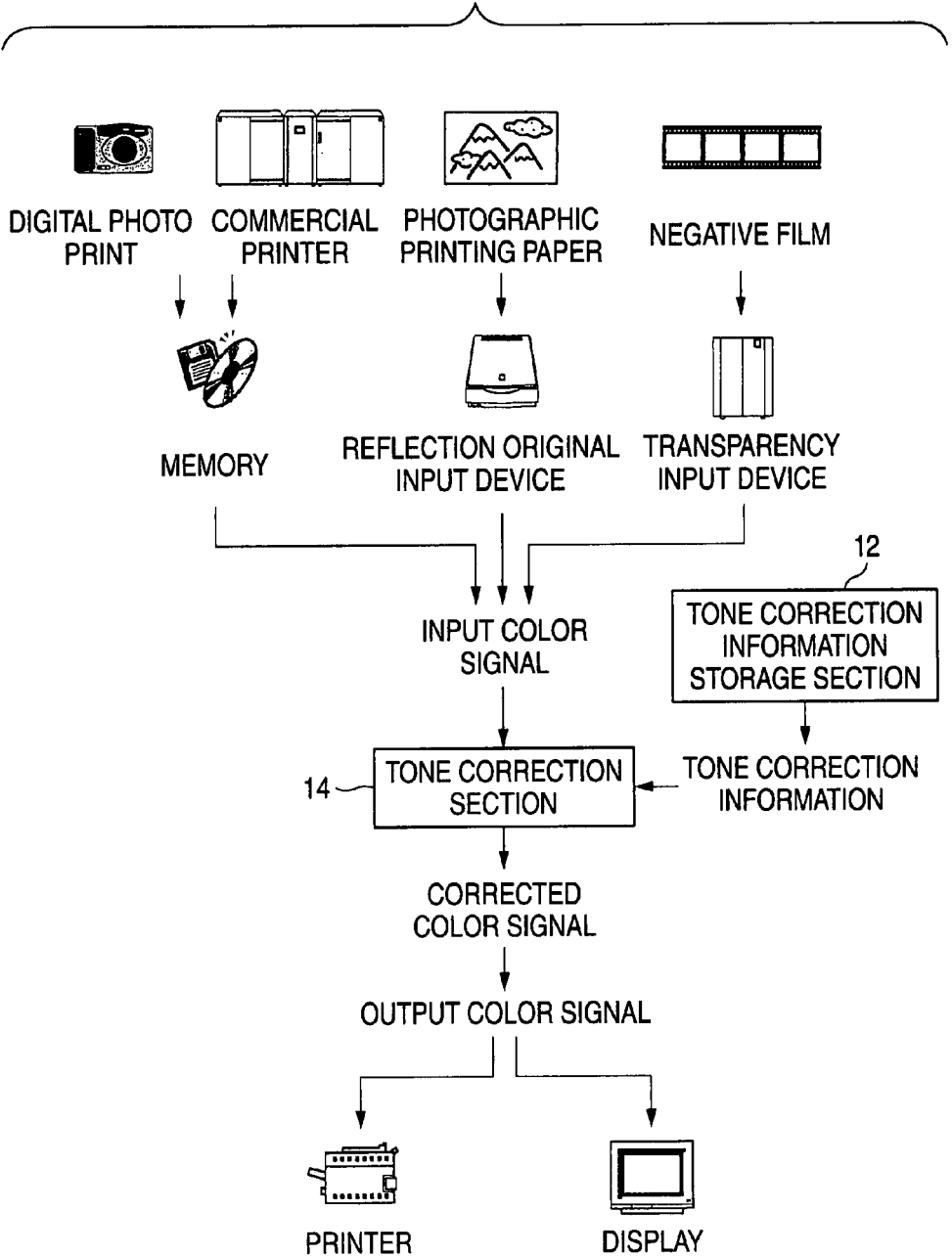

US 8,107,140 B2

COLOR PROCESSING APPARATUS, COLOR PROCESSING METHOD, AND COMPUTER READABLE MEDIUM

CROSS-REFERENCE TO RELATED APPLICATIONS

This application is based on and claims priority under 35 U.S.C. §119 from Japanese Patent Application No. 2006-245941 filed Sep. 11, 2006.

BACKGROUND

1. Technical Field

The invention relates to a color processing apparatus and the like for making tone correction, for example.

2. Related Art

In order to achieve better image quality, some correction is often performed for image data such as a natural image before such image data is output to a color output device such as a printer or a display.

For example, brightness of the entire image and/or brightness in a human's face region is corrected. Generally, such a correction is often performed with using a tone curve. However, when the tone curve has some shape, the corrected color may be located outside a color gamut of the color output device.

SUMMARY

According to an aspect of the invention, a color processing apparatus includes a storage section, a normalizing section and a tone correction section. The storage section stores tone correction information used in tone correction for a color signal to be corrected. The normalizing section reads the tone correction information from the storage section and normalizes the read tone correction information in accordance with the color signal to be corrected to generate normalized tone correction information. The tone correction section converts the color signal to be corrected into a corrected color signal using the normalized tone correction information.

BRIEF DESCRIPTION OF THE DRAWINGS

Exemplary embodiments of the invention will be described in detail below with reference to the accompanying drawings wherein:

FIG. 1 is a block diagram to show the function of a color processing apparatus for making tone correction to which an exemplary embodiment of the invention is applied and for converting an input color signal into an output color signal;

FIG. 2 is a schematic representation to show an example of normalizing a tone curve;

FIG. 10 is a block diagram to schematically show the function of the color processing apparatus for making the tone correction for an input color signal and converting the corrected color signal into an output color signal;

DETAILED DESCRIPTION

Exemplary embodiments of the invention will be described in detail. However, it is to be understood that the invention is not limited to the following exemplary embodiments, and that various modifications may be made without departing from the spirit and the scope of the invention.

FIG. 10 is a block diagram to schematically show the function of a color processing apparatus, which makes tone correction for an input color signal and converts the corrected input color signal into an output color signal.

The input color signal may be image data captured by a digital camera and stored in memory; image data, in which color signals for a commercial printer are recorded, in memory; image data read through a reflection original input device from silver halide photographic printing paper on which a color or monochrome image is printed; or image data read through a transparency input device from a photographic-sensitized material of a color or monochrome negative film.

Tone correction information is stored in a tone correction information storage section 12. A tone correction section 14 executes tone correction for the input color signal according to the tone correction information acquired from the tone correction information storage section 12. Then, an output color signal is provided.

A color output device such as a printer or a display displays with using this output color signal.

To execute the tone correction for a color signal, there are two methods. The former method creates the tone correction information indicating a relationship between tone before the tone correction and tone after the tone correction based on individual color components such as RGB or CMYK of the color signals of the color output device, and then executes the tone correction based on the thus-prepared tone correction information. The latter method prepares the tone correction information based on individual color components of a luminance/color difference space such as L*a*b color space or YCbCr color space and executes the tone correction based on the thus-prepared tone correction information.

Figure 11:
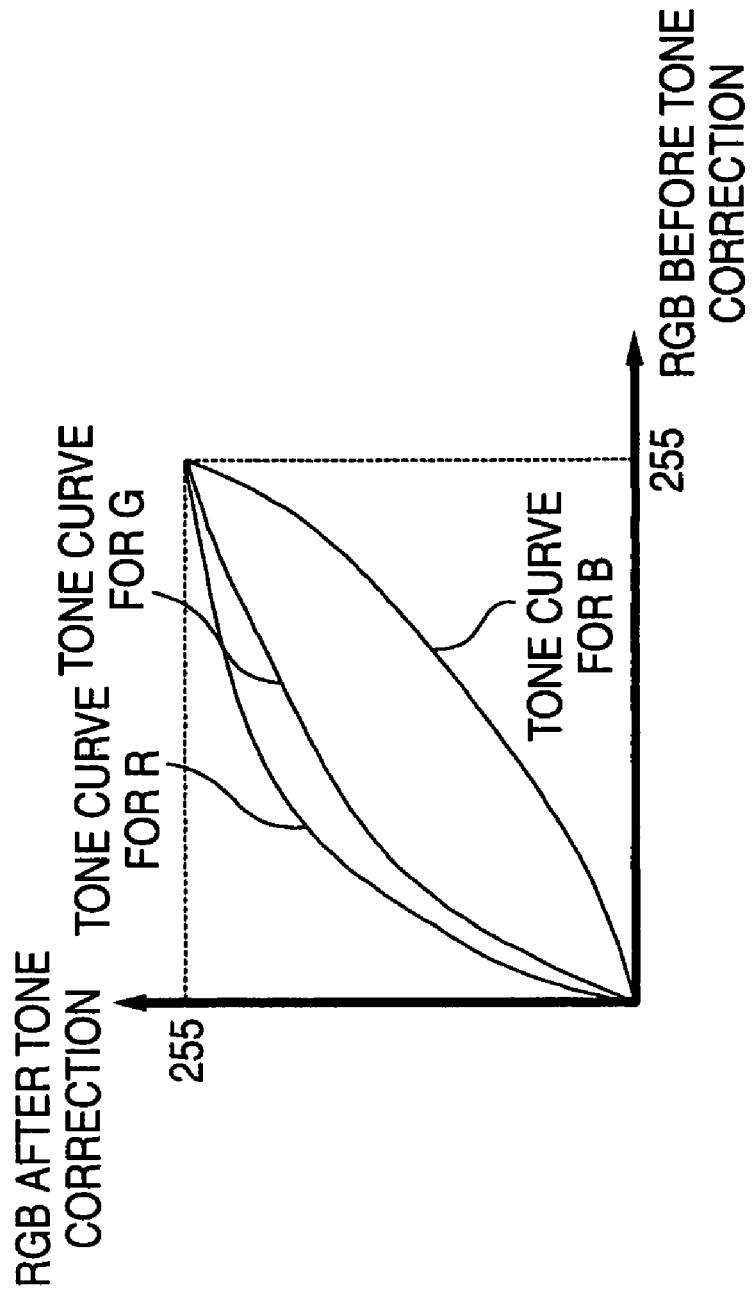
FIG. 11 is a schematic representation to represent the tone correction information as tone curves displayed two-dimensionally with the horizontal axis representing tone before the tone correction and the vertical axis representing tone after the tone correction, when the tone correction is made for the individual color components of RGB color signals.

FIG. 11 is a schematic representation to represent the tone correction information as tone curves displayed two-dimensionally with the horizontal axis representing tone before the tone correction and the vertical axis representing tone after the tone correction, when the tone correction is made for the individual color components of RGB color signals.

The tone correction is made within a range of values that can be taken by the respective color components. Thus, the corrected colors are not placed outside a color gamut of the color output device.

On the other hand, considering the case where the tone correction is made in the luminance/color difference space such as L*a*b color space or YCbCr color space, the luminance/color difference space has such nature that when L* or Y representing luminance is moderate, a color reproduction range of chromaticity such as a*b* or CbCr is wide, and as the luminance gets higher or lower, the color reproduction range gets narrower.

Thus, as the tone correction for the luminance is made, the resultant color may be located outside the color gamut of the color output device, depending on the chromaticity.

FIG. 12 is a schematic representation to show an example where when the tone correction is made for luminance Y in YCnCr color space, the resultant color is located outside a color gamut.

For convenience of description, YCbCr color space is shown two-dimensionally with a CbCr axis collectively expressing Cb and Cr and a Y axis.

Figure 12B:
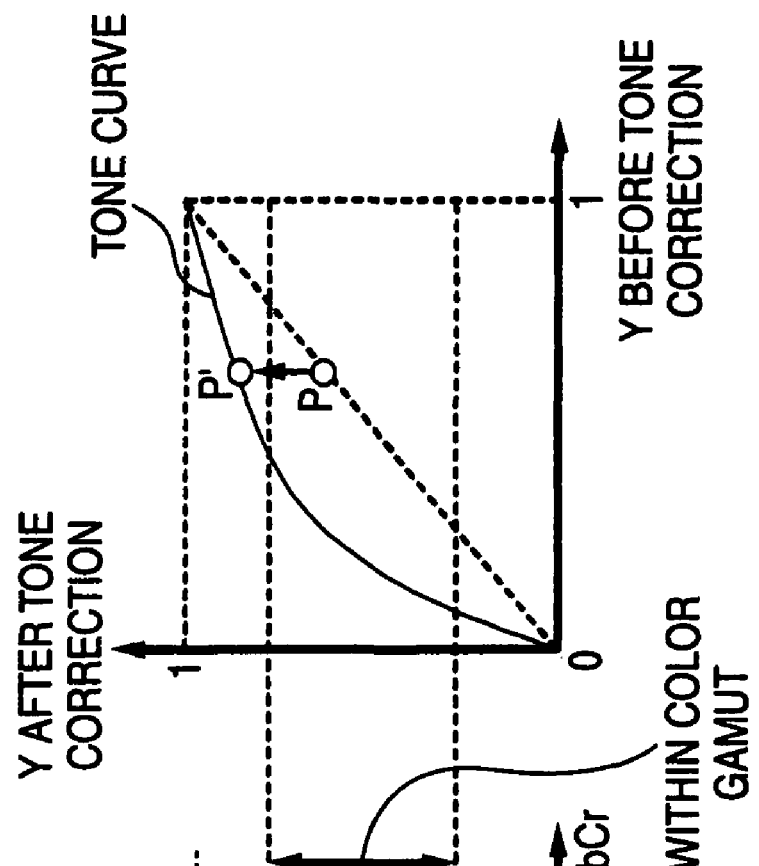
FIG. 12 is a schematic representation to show an example where when the tone correction is made for luminance Y in YCnCr color space, the resultant color is located outside a color gamut.
Figure 12A:
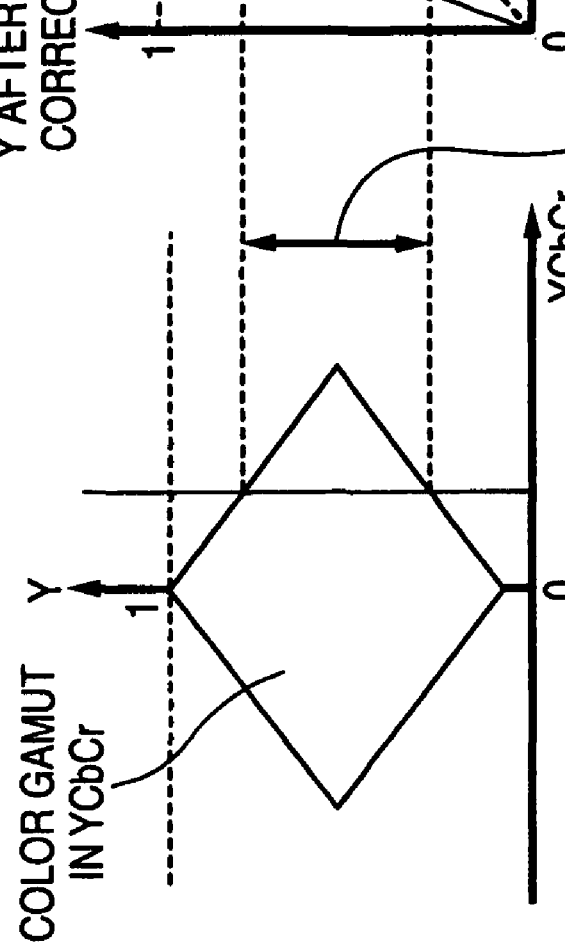

FIG. 12A is a schematic representation to represent the color gamut in the YCbCr color space.

If CbCr is equal to 0, the luminance Y can take all values in a range of 0 to 1. However, it can be seen that as CbCr moves in the positive direction or the negative direction, the values that can be taken by the luminance Y gets narrower between 0 and 1.

FIG. 12B is a schematic representation to represent the tone correction information used in the tone correction for Y, as a tone curve.

It can be seen that if the tone correction is made according to the tone curve, a point P before the tone correction moves to a point P' after the tone correction, which is located outside the color gamut.

Whether or not the correction result is located outside the color gamut of a color output device can be determined by whether all of values of RGB or CMYK converted from L*a*b or YCbCr are located within a range that RGB or CMYK can take.

If the correction result is located outside the color gamut, at least one color component of RGB or CMYK is located outside the range of values that can be taken (for example, if RGB can take a value in a range of 0 to 255, R=280).

In such a case, if the color component of RGB, CMYK, etc., is clipped to the maximum value or the minimum value of the values that can be taken (for example, R=280 is clipped to 255), the resultant color becomes different from the color to be reproduced, for example, the hue drastically changes.

To solve the above problem, for example, there are the following methods. For example, one method determines whether or not colors contained in an image are located outside the color gamut and compresses colors toward the color gamut when the colors are located outside the color gamut. Another method executes the tone correction and then determines whether the corrected color is located within or outside the color gamut and executes color gamut compression for the corrected color, which is determined outside the color gamut with the hue being maintained.

Each of these methods basically includes determining as to whether a color is located within or outside the color gamut and executing the color gamut compression.

However, after the tone correction is made, it is difficult to execute the color gamut compression for the color located outside the color gamut while maintaining gradation and continuity just after the tone correction.

As the number of colors located outside the color gamut is larger, it takes longer processing time in determining as to whether each color is located within or outside the color gamut.

Then, in this exemplary embodiment, the above-described problem is solved by the following method.

FIG. 1 is a block diagram to show the function of a color processing apparatus for executing the tone correction to which this exemplary embodiment of the invention is applied and converts the input color signal into the output color signal.

The color processing apparatus shown in FIG. 1 includes an image information acquiring section 11 for acquiring an image signal including a predetermined input color signal, for example, from an external computer (not shown). The color processing apparatus also includes a tone correction information storage section 12 for storing tone correction information. The color processing apparatus further includes a tone correction information normalizing section 13 for normalizing the tone correction information read by a control section (not shown) in accordance with the input color signal to generate normalized tone correction information. The color processing apparatus includes a tone correction section 14 for executing tone correction for the input color signal according to the normalized tone correction information to generate a corrected color signal, and a color converting section 15 for converting the corrected color signal into a color signal of an output device and for outputting the color signal of the output signal as an output color signal.

The image information acquiring section 11 acquires the image signal including the predetermined input color signal from the external computer as described above. In this exemplary embodiment, it is assumed that the input color signal is YCbCr. It is also assumed that the output color signal is RGB.

The tone correction information storage section 12 stores the tone correction information, which is represented as a tone curve as shown in FIG. 12B, for example. If it is assumed that tone correction for Y (luminance) is made, the tone correction information for Y is read from the tone correction information storage section 12 according a command of the control section.

If the tone curve is applied as it is, some point after the tone correction may be located outside the color gamut as shown in FIG. 12B, depending on ae value of CbCr. Therefore, in this exemplary embodiment, the tone correction information normalizing section 13 normalizes the tone correction information.

Figure 3A:
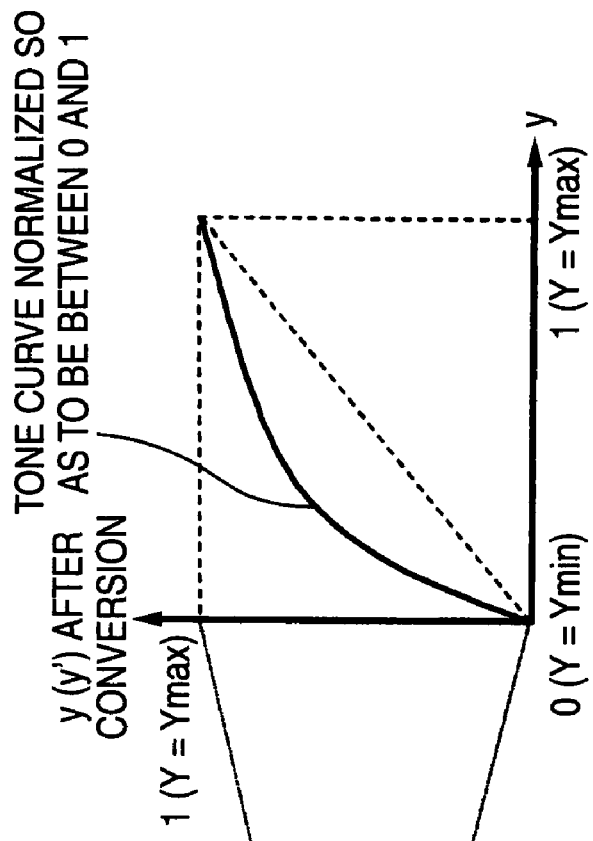
FIG. 3 is a schematic representation to show an example of normalizing the tone curve.

FIGS. 2 and 3 are schematic representations to show an example of normalizing the tone correction information.

Here, the tone curve of Y is normalized in accordance with values of Cb and Cr.

As shown in FIG. 2A, the maximum luminance Y and the minimum luminance Y within the color gamut should be defined in accordance with the values of Cb and Cr and therefore, are first calculated as Ymax and Ymin.

As shown in FIG. 2B, a range between Ymax and Ymin is set to a tone correction range, and the tone correction information is normalized.

Figure 3B:
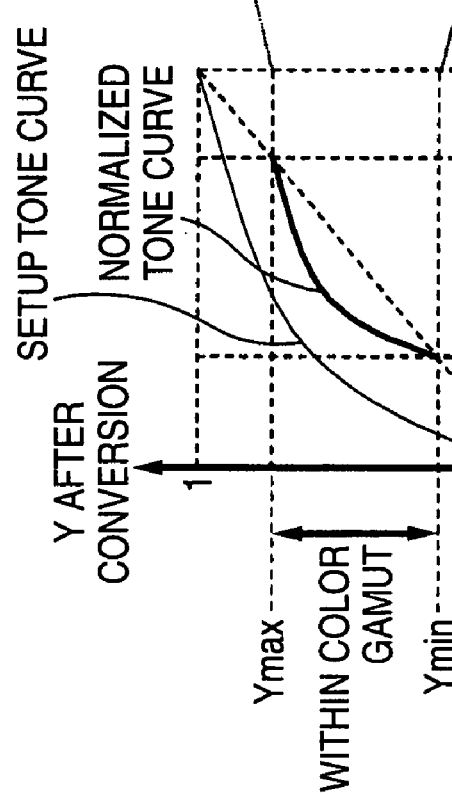

Accordingly, new tone correction information with Ymax and Ymin being set to 1 and 0, respectively can be defined like a tone curve as shown in FIG. 3B. Here, Y after the normalization is represented as y.

Next, a specific procedure of normalizing the tone correction information will be described.

For example, for simplicity, it is assumed that color conversion of RGB to YCbCr can be executed using linear conversion coefficients. Let a conversion coefficient matrix be S.

Then, a relationship between the respective color components RGB and the respective color components YCbCr can be represented as follows.

$$\begin{pmatrix} Y \\ Cb \\ Cr \end{pmatrix} = S \begin{pmatrix} R \\ G \\ B \end{pmatrix} \quad (1)$$

$$= \begin{pmatrix} s_{11} & s_{12} & s_{13} \\ s_{21} & s_{22} & s_{23} \\ s_{31} & s_{32} & s_{33} \end{pmatrix} \begin{pmatrix} R \\ G \\ B \end{pmatrix}$$

$$= \begin{pmatrix} s_{11}R + s_{12}G + s_{13}B \\ s_{21}R + s_{22}G + s_{23}B \\ s_{31}R + s_{32}G + s_{33}B \end{pmatrix}$$

RGB is additive color mixture. It is assumed that RGB is in the range of 0 to 1. In this case, any of R, G or B should be 1 on the upper plane (where Y takes a larger value) of the color gamut in the YCbCr space shown in FIG. 2A.

Since Cb and Cr are fixed, if, for example, R=1 is substituted, R, Cb and Cr are known and Y, G and B are unknown.

In this case, when the expression (1) is manipulated and is transformed that the unknown quantities can be calculated, the following expression (2) is obtained.

$$\begin{pmatrix} Y \\ G \\ B \end{pmatrix} = S_{R=1} \begin{pmatrix} R \\ Cb \\ Cr \end{pmatrix} \quad (2)$$

Here, $S_{R=1}$ denotes a matrix calculated by manipulating the expression 1 when R=1 is substituted. G and B are calculated according to the expression 2. At this time, if $0 \leq G \leq 1$ and $0 \leq B \leq 1$, Y becomes Ymax.

If G does not satisfy $0 \leq G \leq 1$ and B does not satisfy $0 \leq B \leq 1$, G=1 or B=1 is set as with R and then, the set of unknown quantities Y, R and B and the set of unknown quantities Y, R and G can be calculated according to the following expressions.

$$\begin{pmatrix} Y \\ R \\ B \end{pmatrix} = S_{G=1} \begin{pmatrix} G \\ Cb \\ Cr \end{pmatrix} \quad (3)$$

$$\begin{pmatrix} Y \\ R \\ G \end{pmatrix} = S_{B=1} \begin{pmatrix} B \\ Cb \\ Cr \end{pmatrix} \quad (4)$$

Here, $S_{G=1}$ denotes a matrix calculated by manipulating the expression 1 when G=1 is substituted. Also, $S_{B=1}$ denotes a matrix calculated by manipulating the expression 1 when B=1 is substituted. Ymax can be calculated according to any of the expressions 2 to 4, and the values of R, G and B are also obtained simultaneously (it is noted that one of R, G, and B is equal to 1).

Figure 4:
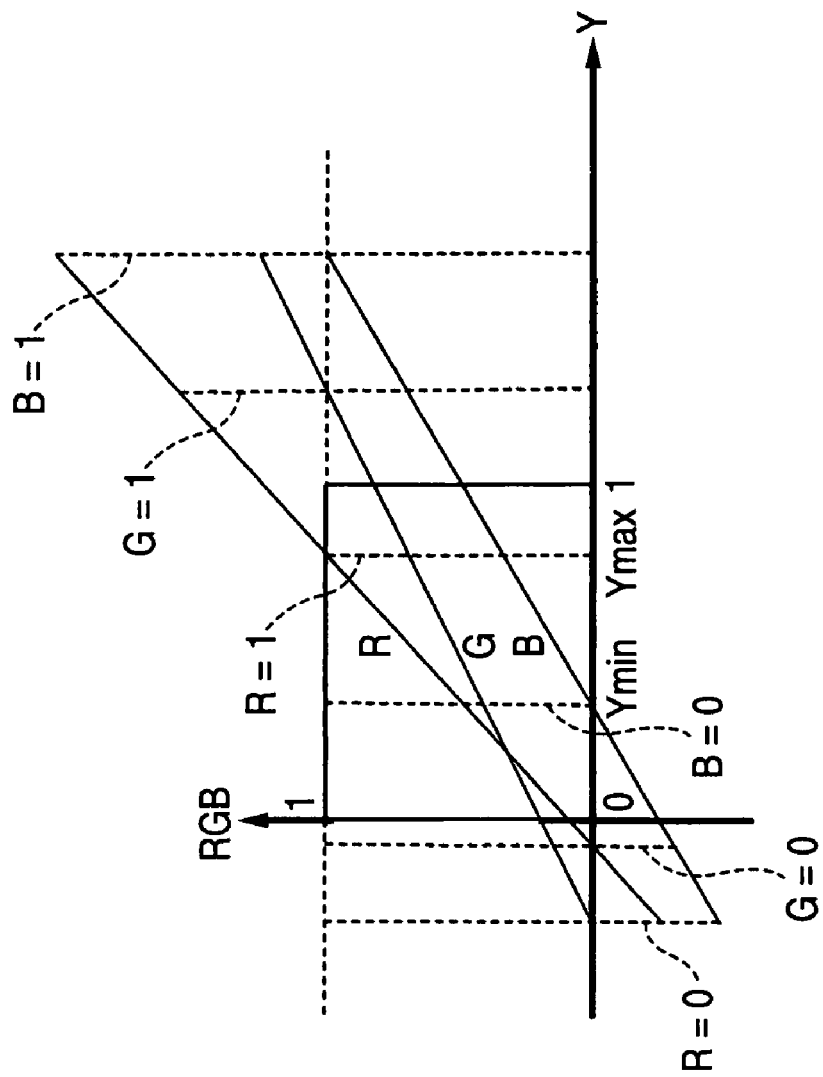
FIG. 4 is a schematic representation to represent an image of calculating Ymax and Ymin in the case where color conversion can be executed with linear conversion coefficients.

FIG. 4 is a schematic representation to represent an image of calculating Ymax and Ymin if it is assumed that color conversion can be executed with linear conversion coefficients.

When R=1, if $0 \leq G \leq 1$ and $0 \leq B \leq 1$ are satisfied, R and B calculated according to the expression (3) or R and G calculated according to the expression (4) are not in the range of 0 to 1, that is, are located outside the range as can bee seen in FIG. 4.

Therefore, in this example, Ymax is calculated with R=1.

Likewise, any of R, G and B should be 0 on the lower surface (where Y takes a lower value) in the color gamut of the YCbCr space shown in FIG. 2A.

Therefore, any of R, G and B is set to 0. Thereby, Ymin can be calculated as in the above method of finding Ymax.

When Y, R, G and B are thus found, Y at the time when all of R, G and B are within the range of 0 to 1 is Ymin. In this example shown in FIG. 4, when B=0, Ymin can be calculated.

In this example, the case where the color conversion system is linear as represented by the expression (1) is shown for simplicity. However, similar processing can also be performed in the case where the color conversion system is nonlinear.

For example, it is assumed that color conversion from RGB to YCbCr is represented by using a nonlinear mapping F as follows.

$$\begin{pmatrix} Y \\ Cb \\ Cr \end{pmatrix} = F \begin{pmatrix} R \\ G \\ B \end{pmatrix} \quad (5)$$

Calculating of Ymax will be first described.

Let any of R, G and B be 1 and an inverse mapping of the mapping F be $F^{-1}$. In this case, the following respective expressions (6) to (8) become true.

First, when R=1 is set, color conversion can be represented as $$\begin{pmatrix} Y \\ G \\ B \end{pmatrix} = F^{-1} \begin{pmatrix} R \\ Cb \\ Cr \end{pmatrix} \quad (6)$$

Likewise, when G=1 is set, color conversion can be represented as $$\begin{pmatrix} Y \\ R \\ B \end{pmatrix} = F^{-1} \begin{pmatrix} G \\ Cb \\ Cr \end{pmatrix} \quad (7)$$

Further, when B=1 is set, color conversion can be represented as $$\begin{pmatrix} Y \\ R \\ G \end{pmatrix} = F^{-1} \begin{pmatrix} B \\ Cb \\ Cr \end{pmatrix} \quad (8)$$

If unknown and known quantities fit each other regardless of the form of the mapping F, the inverse mapping $F^{-1}$ for executing inverse conversion exists. Thus, Ymax may be calculated using the expressions (6) to (8).

Ymin can also be calculated in a similar manner.

In the expressions (6) to (8), an expression with any of R, G and B set to 0 is derived and then, Ymin is calculated.

Figure 5:
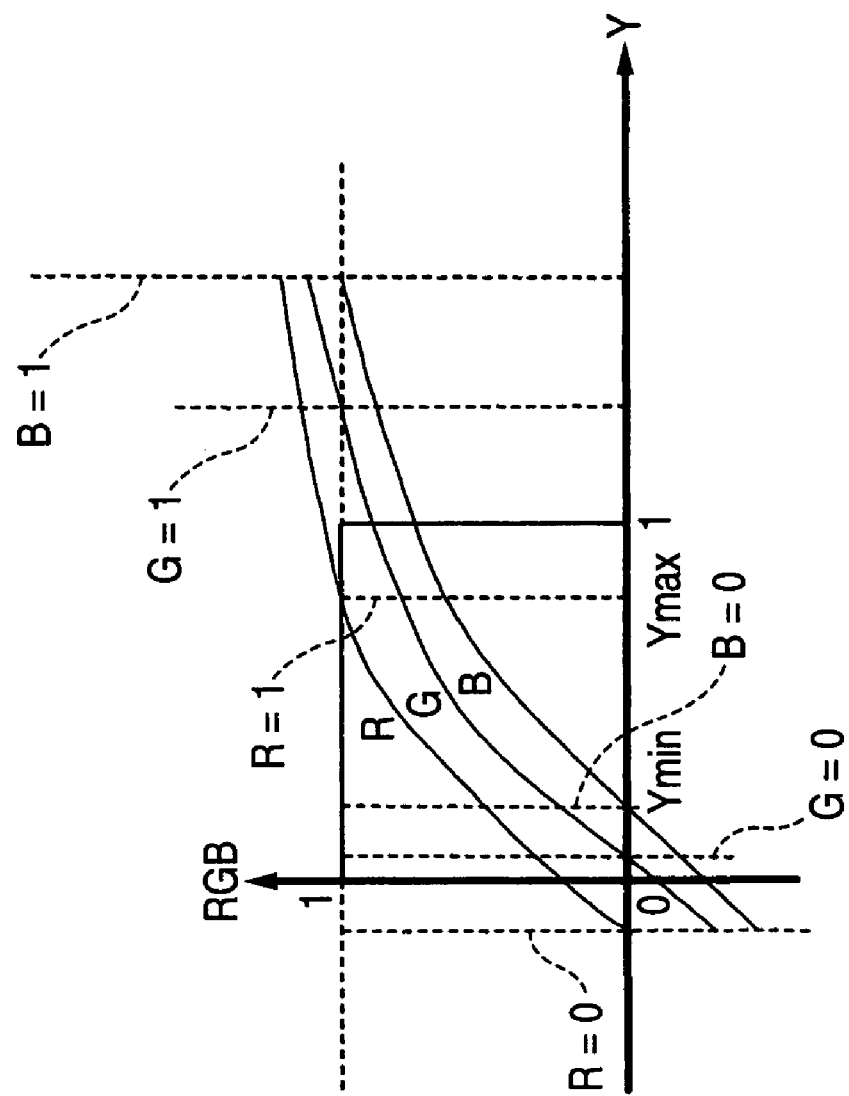
FIG. 5 is a schematic representation to represent an image of calculating Ymax and Ymin in the case where color conversion is executed as nonlinear conversion.

FIG. 5 is a schematic representation to represent an image of calculating Ymax and Ymin if the color conversion is executed as nonlinear conversion.

It is seen in FIG. 5 that when R=1, G and B are located in the range of 0 to 1 and Ymax is calculated, and that when B=0, R and G are located in the range of 0 to 1 and Ymin is calculated.

Next, the tone correction section 14 will be described.

The tone correction information for Y is normalized using Ymax and Ymin, which are calculated as described above. To normalize the tone correction information for Y, tone correction is made using a normalized tone curve representing normalized tone correction information as shown in FIG. 3B.

Let normalized Y be y. For example, y can be calculated according to the following expression.

$$y = \frac{Y - Y_{min}}{Y_{max} - Y_{min}} \quad (9)$$

y calculated according to the expression (9) is corrected based on the normalized tone curve shown in FIG. 3B to calculate y'. A corrected color signal Y' can be obtained from y' according to the following expression, which is an inverse operation of the expression (9).

$$Y' = y'(Y_{max} - Y_{min}) + Y_{min} = f_n(y)(Y_{max} - Y_{min}) + Y_{min} \quad (10)$$

Here, it is assumed that $f_n$ represents the tone correction based on the normalized tone curve.

As described above, the input color signal YCbCr is subjected to the tone correction in luminance and becomes a corrected color signal Y'CbCr.

The expression (9) is such normalization of changing only the range without changing the shape of the normalized tone curve representing the setup tone correction information. In the exemplary embodiment, however, if necessary for the purpose of natural tone reproduction, the shape of the tone curve may be changed in the normalization.

After the tone correction is made, the color converting section 15 performs a process of converting the corrected color signal into RGB, which is a color signal of a color output device.

Since the color conversion from RGB to YCbCr can be calculated according to the expression (1) or (5), the color conversion from Y'CbCr to RGB can be executed using an inverse matrix or an inverse mapping.

That is, the color conversion may be executed using the following expression (11) and $S^{-1}$, which is the inverse matrix of S, or using the following expression (12) and $F^{-1}$, which is the inverse mapping of F.

$$\begin{pmatrix} R \\ G \\ B \end{pmatrix} = S^{-1} \begin{pmatrix} Y' \\ Cb \\ Cr \end{pmatrix} \quad (11)$$

$$\begin{pmatrix} R \\ G \\ B \end{pmatrix} = F^{-1} \begin{pmatrix} Y' \\ Cb \\ Cr \end{pmatrix} \quad (12)$$

Since the tone correction information normalizing section 13 normalizes the tone correction information, R, G and B can be calculated so as to be within the color gamut of the color output device.

The tone correction for Cb or Cr can also be made like the tone correction for Y described above in this example. That is, in the calculation expressions described so far, Y needs only to be replaced with Cb or Cr for calculation.

The example of the tone correction described above in detail is an example wherein tone correction for any one of Y, Cb or Cr is executed separately. However, tone correction for Y, Cb and Cr may be executed at a time according to the following expression.

Figure 6:
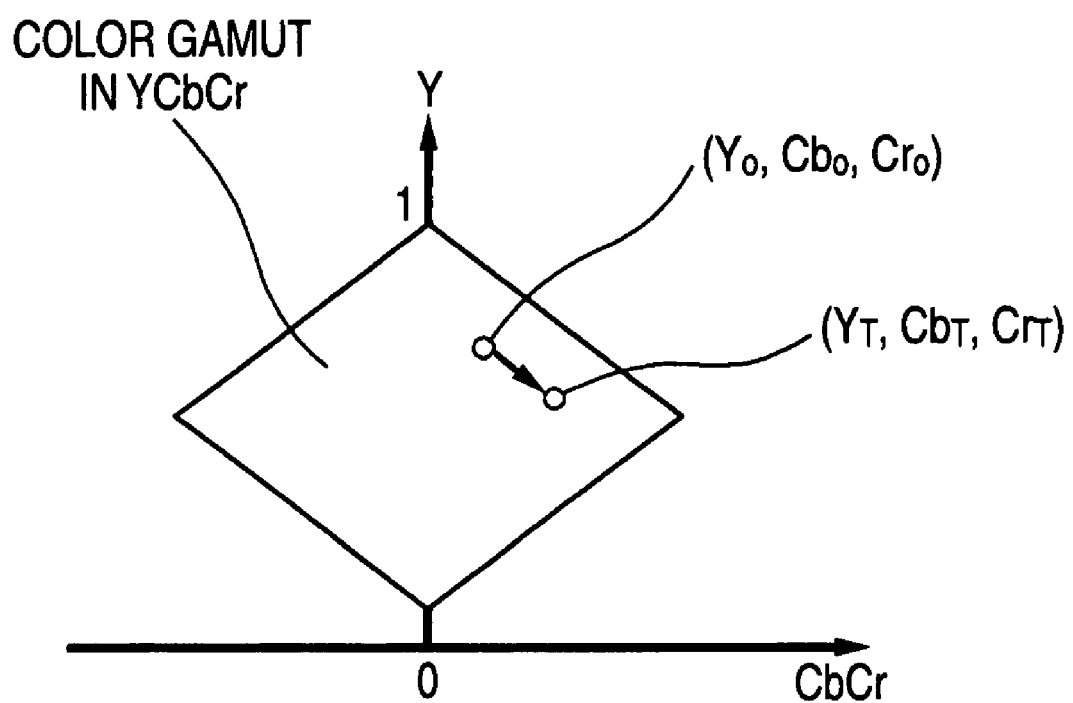
FIG. 6 is a schematic representation to represent an example of executing tone correction for Y, Cb and Cr at a time.

FIG. 6 is a schematic representation to represent an example of executing tone correction for Y, Cb and Cr at a time.

In this example, tone correction for lowering the luminance and raising the saturation is made and $(Y_O, Cb_O, Cr_O)$ is corrected to $(Y_T, Cb_T, Cr_T)$.

FIG. 7 is a schematic representation to show tone correction information for the color signals of Y, Cb, and Cr as tone curves.

Figure 7A:
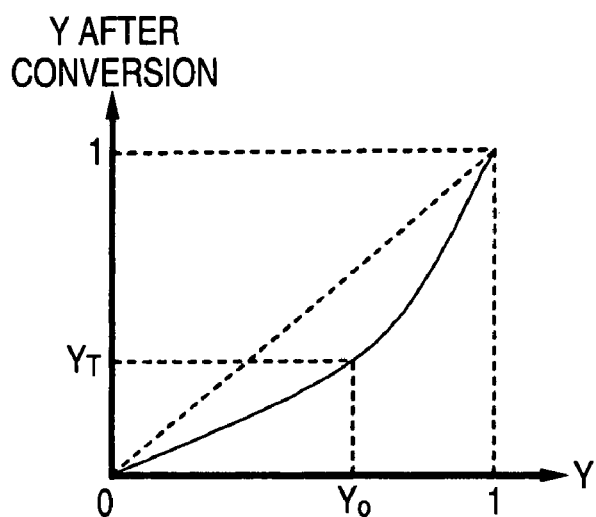
FIG. 7 is a schematic representation to show tone correction information for respective color signals Y, Cb and Cr as tone curves.
Figure 7B:
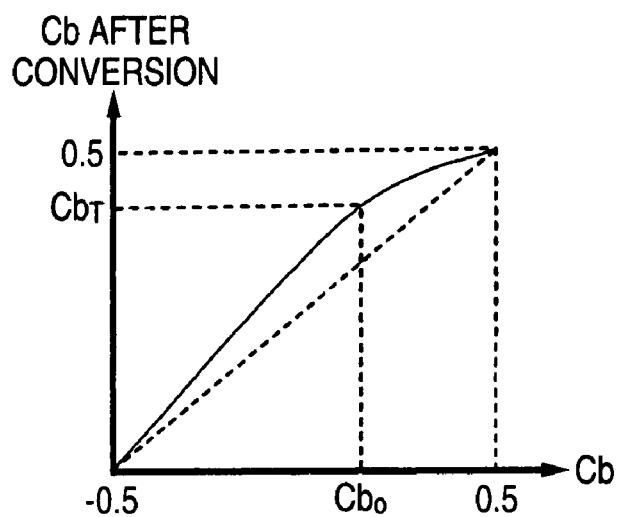
Figure 7C:
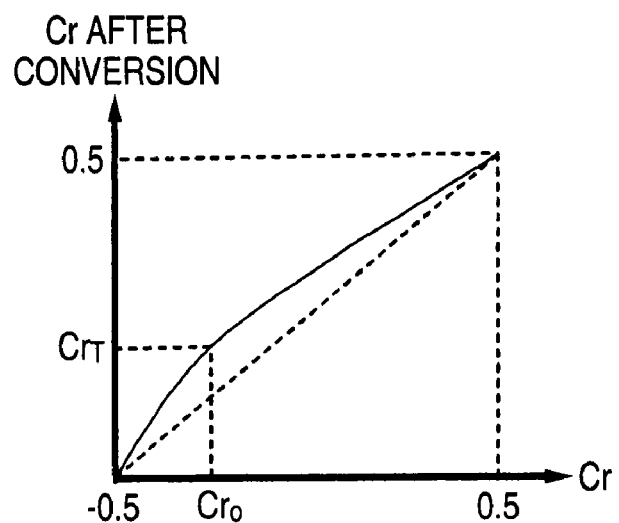

In FIGS. 7A to 7C, the range of Y is 0 to 1 and the range of each of Cb and Cr is −0.5 to 0.5.

When such tone curves are set, the result after conversion may be located outside the color gamut depending on the input color signal as in the example described above. Then, in such a case, normalization of the tone correction information is required.

Figure 8:
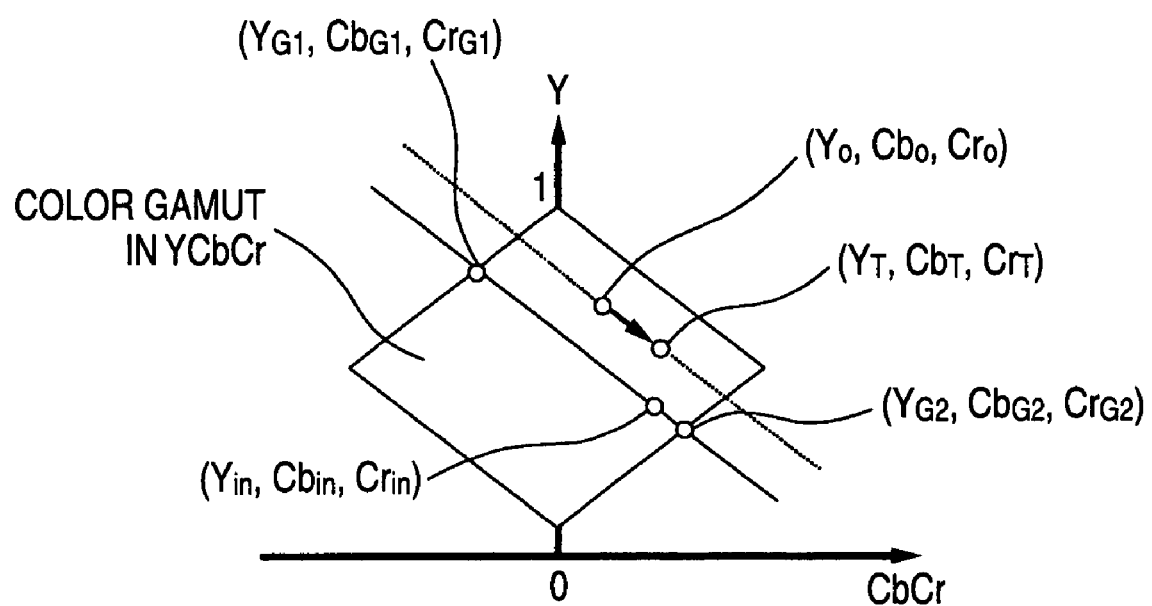
FIG. 8 is a schematic representation to represent an example of executing the tone correction for Y, Cb, and Cr at a time.

FIG. 8 is a schematic representation to represent an example of executing the tone correction for Y, Cb, and Cr at a time.

For example, let an input color signal be $(Y_{in}, Cb_{in}, Cr_{in})$. Here, a line passing through $(Y_{in}, Cb_{in}, Cr_{in})$, whose direction vector is a vector from $(Y_O, Cb_O, Cr_O)$ to $(Y_T, Cb_T, Cr_T)$ as represented by the expression shown below can be set.

At this time, the expression of the line is represented by the following expression (13).

$$\begin{cases} Y = Y_{in} + \alpha_Y t \\ Cb = Cb_{in} + \alpha_{Cb} t \\ Cr = Cr_{in} + \alpha_{Cr} t \end{cases} \quad (13)$$

Here, $(\alpha_Y, \alpha_{Cb}, \alpha_{Cr})$ is a direction vector from $(Y_O, Cb_O, Cr_O)$ to $(Y_T, Cb_T, Cr_T)$. $\alpha_Y, \alpha_{Cb}$, and $\alpha_{Cr}$ are represented by the following expression (14).

$$\begin{cases} \alpha_Y = Y_T - Y_o \\ \alpha_{Cb} = Cb_T - Cb_o \\ \alpha_{Cr} = Cr_T - Cr_o \end{cases} \quad (14)$$

Next, an intersection point of the line represented by expression (13) and the contour of the color gamut is obtained.

For example, when color conversion from RGB to YCbCr is represented by the conversion expression (1), inverse conversion is represented by the following expression (15) using the parameter t.

$$\begin{pmatrix} R \\ G \\ B \end{pmatrix} = S^{-1} \begin{pmatrix} Y \\ Cb \\ Cr \end{pmatrix} = S^{-1} \begin{pmatrix} Y_o + \alpha_Y t \\ Cb_o + \alpha_{Cb} t \\ Cr_o + \alpha_{Cr} t \end{pmatrix} \quad (15)$$

The intersection point between the line represented by expression (13) and the contour of the color gamut can be calculated by setting any of R, G or B in the expression (15) to 0 or 1 as in the example described above.

If the color component relationships between RGB and YCbCr can be represented by the expression (15), the value of t is be uniquely determined.

Since the number of the intersection points between the line and the color gamut contour is two, when any of R, G or B is set to 0 or 1, two t values placing all of R, G and B within the color gamut can be calculated. The t values may be calculated in order, and whether or not each of R, G and B is within a predetermined range may be checked.

Let the t values thus calculated be $t_{G1}$ and $t_{G2}$. $(Y_{G1}, Cb_{G1}, Cr_{G1})$ and $(Y_{G2}, Cb_{G2}, Cr_{G2})$ of the intersection points between the line and the contour of the color gamut can be calculated according to the following expressions (16) and (17).

$$\begin{cases} Y_{G1} = Y_{in} + \alpha_Y t_{G1} \\ Cb_{G1} = Cb_{in} + \alpha_{Cb} t_{G1} \\ Cr_{G1} = Cr_{in} + \alpha_{Cr} t_{G1} \end{cases} \quad (16)$$

$$\begin{cases} Y_{G2} = Y_{in} + \alpha_Y t_{G2} \\ Cb_{G2} = Cb_{in} + \alpha_{Cb} t_{G2} \\ Cr_{G2} = Cr_{in} + \alpha_{Cr} t_{G2} \end{cases} \quad (17)$$

Using $(Y_{G1}, Cb_{G1}, Cr_{G1})$ and $(Y_{G2}, Cb_{G2}, Cr_{G2})$ thus calculated, Ymax, Ymin, Cbmax, Cbmin, Crmax and Crmin, which placing R, G and B within the predetermined range, can be calculated according to the following expressions (18) to (20).

$$\begin{cases} Y_{max} = \max(Y_{G1}, Y_{G2}) \\ Y_{min} = \min(Y_{G1}, Y_{G2}) \end{cases} \quad (18)$$

$$\begin{cases} Cb_{max} = \max(Cb_{G1}, Cb_{G2}) \\ Cb_{min} = \min(Cb_{G1}, Cb_{G2}) \end{cases} \quad (19)$$

$$\begin{cases} Cr_{max} = \max(Cr_{G1}, Cr_{G2}) \\ Cr_{min} = \min(Cr_{G1}, Cr_{G2}) \end{cases} \quad (20)$$

The tone correction information can be normalized from Ymax, Ymin, Cbmax, Cbmin, Crmax and Crmin thus obtained.

Figure 9A:
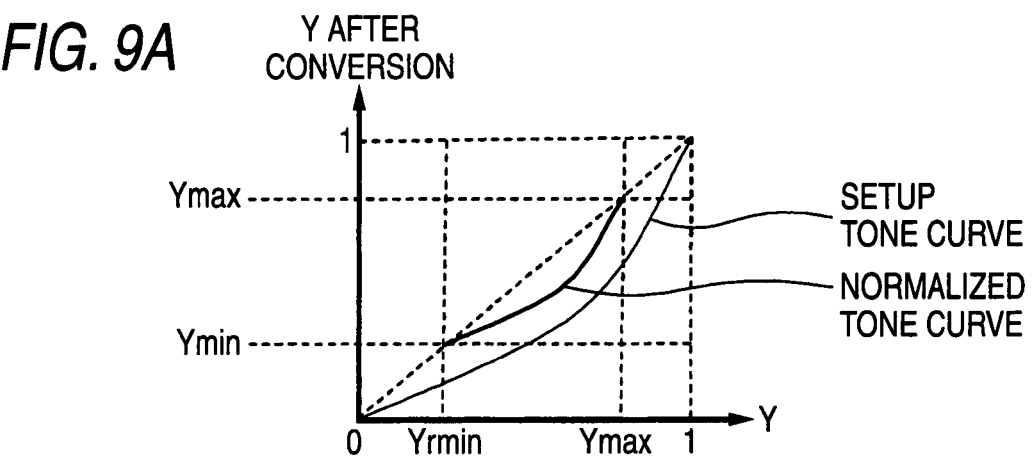
FIG. 9 shows examples of the tone correction information for Y, Cb, and Cr normalized according to the exemplary embodiments, as tone curves.
Figure 9B:
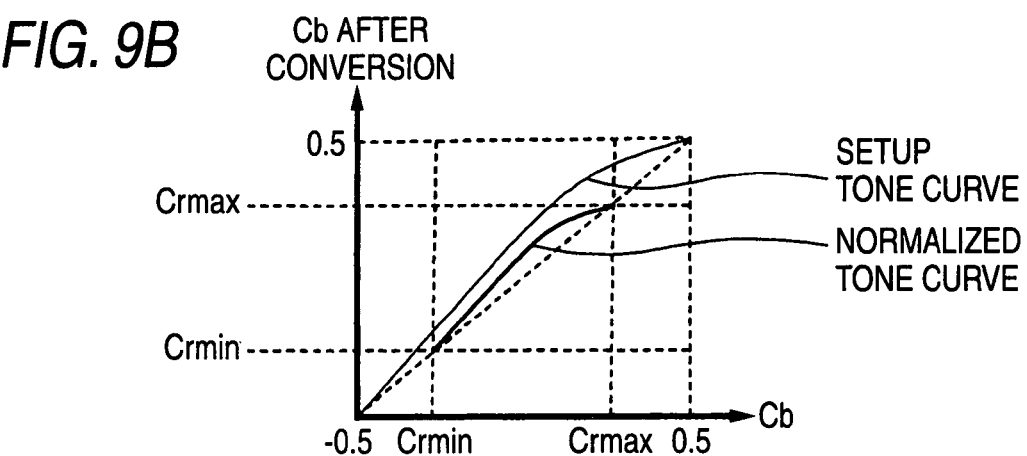
Figure 9C:
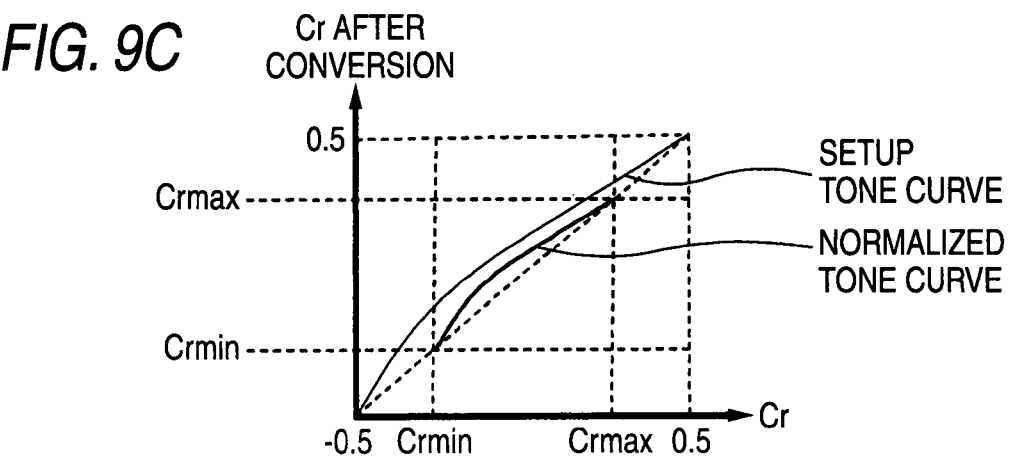

FIG. 9 shows examples of the tone correction information for Y (FIG. 9A), Cb (FIG. 9B), and Cr (FIG. 9C), which are normalized according to the exemplary embodiments, as tone curves.

Also in this case, if necessary for the purpose of natural tone reproduction, for example, the shape of each tone curve may be changed in the normalization as in the exemplary embodiment, of course.

Processing executed by the tone correction section 14 and the color converting section 15 is similar to that in the example described above, and therefore will not be discussed again.

What is claimed is:

1. A color processing apparatus comprising:
an image signal acquiring section that acquires an image signal including an input color signal belonging to an input color space having at least a first color component;
a storage section that stores tone correction information used in tone correction for the input color signal;
a normalizing section that
reads the tone correction information from the storage section,
calculates a first value of the first color component of the input color space based on the input color signal and a maximum value of a second color component of an output color space being different from the input color space,
calculates a second value of the first color component of the input color space based on the input color signal and a minimum value of a third color component of the output color space, and
normalizes the read tone correction information in accordance with the first and second values of the first color component of the input color space; and
a tone correction section that converts the input color signal into a corrected color signal using the normalized tone correction information; and
a color converting section that converts the corrected color signal into an output color signal belonging to the output color space.

2. A color processing method comprising:
acquiring an image signal including an input color signal belonging to an input color space having at least a first color component;
acquiring tone correction information used in tone correction for the input color signal;
calculating a first value of the first color component of the input color space based on the input color signal and a maximum value of a second color component of an output color space being different from the input color space;
calculating a second value of the first color component of the input color space based on the input color signal and a minimum value of a third color component of the output color space;
normalizing the acquired tone correction information in accordance with the first and second values of the first color component of the input color space; and
converting the input color signal into a corrected color signal using the normalized tone correction information; and
converting the corrected color signal into an output color signal belonging to the output color space.

3. A non-transitory computer readable medium storing a program causing a computer to execute a tone correction process, the process comprising:
acquiring an image signal including an input color signal belonging to an input color space having at least a first color component;
acquiring tone correction information used in tone correction for a color signal to be corrected;
calculating a first value of the first color component of the input color space based on the input color signal and a maximum value of a second color component of an output color space being different from the input color space;
calculating a second value of the first color component of the input color space based on the input color signal and a minimum value of a third color component of the output color space;
normalizing the acquired tone correction information in accordance with the first and second values of the first color component of the input color space; and
converting the input color signal into a corrected color signal using the normalized tone correction information; and
converting the corrected color signal into an output color signal belonging to the output color space.

4. The color processing apparatus according to claim 1, wherein the input color space is a luminance/color difference space.

5. The color processing apparatus according to claim 4, wherein the luminance/color difference space is one selected from the group consisting of an L*a*b* color space and a YCrCb color space.

6. The color processing apparatus according to claim 1, wherein the output color space is a device-dependent color space.

7. The color processing apparatus according to claim 6, wherein the device-dependent color space is one selected from the group consisting of an RGB color space and a CMYK color space.

8. The color processing apparatus according to claim 1, wherein
the output color space is an RGB color space, and
the second and third color components of the output color space are selected from a red component, a green component and a blue component of the RGB color space.

9. The color processing method according to claim 2, wherein the input color space is a luminance/color difference space.

10. The color processing method according to claim 9, wherein the luminance/color difference space is one selected from the group consisting of an L*a*b* color space and a YCrCb color space.

11. The color processing method according to claim 2, wherein the output color space is a device-dependent color space.

12. The color processing method according to claim 11, wherein the device-dependent color space is one selected from the group consisting of an RGB color space and a CMYK color space.

13. The color processing method according to claim 2, wherein
the output color space is an RGB color space, and
the second and third color components of the output color space are selected from a red component, a green component and a blue component of the RGB color space.

14. The non-transitory computer readable medium according to claim 3, wherein the input color space is a luminance/color difference space.

15. The non-transitory computer readable medium according to claim 14, wherein the luminance/color difference space is one selected from the group consisting of an L*a*b* color space and a YCrCb color space.

16. The non-transitory computer readable medium according to claim 3, wherein the output color space is a device-dependent color space.

17. The non-transitory computer readable medium according to claim 16, wherein the device-dependent color space is one selected from the group consisting of an RGB color space and a CMYK color space.

18. The non-transitory computer readable medium according to claim 3, wherein
the output color space is an RGB color space, and
the second and third color components of the output color space are selected from a red component, a green component and a blue component of the RGB color space.

* * * * *